R. R. BRAKEMAN.
HANDLE.
APPLICATION FILED OCT. 23, 1908.
928,101.   Patented July 13, 1909.
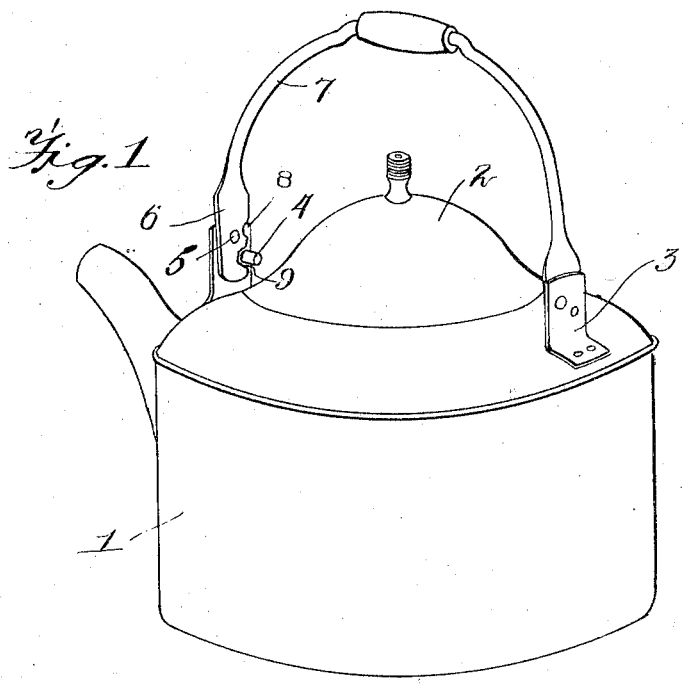
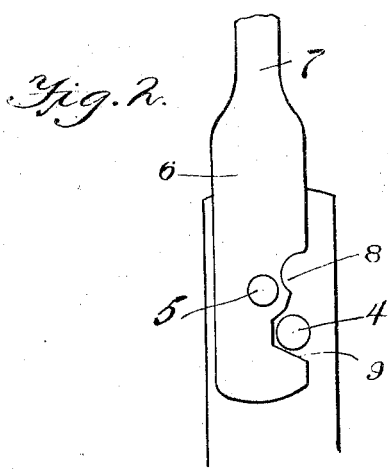
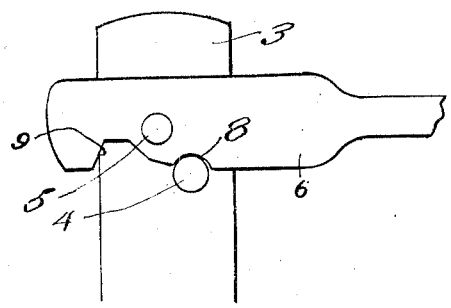
Witnesses
Addison W. Smith.
W. M. Roerth.
Inventor
Rollin R. Brakeman.
By Victor J. Evans
Attorney

UNITED STATES PATENT OFFICE.

ROLLIN R. BRAKEMAN, OF PALATKA, FLORIDA.

HANDLE.

No. 928,101.

Specification of Letters Patent. Patented July 13, 1909.

Application filed October 23, 1908. Serial No. 459,182.

*To all whom it may concern:*

Be it known that I, ROLLIN R. BRAKEMAN, a citizen of the United States, residing at Palatka, in the county of Putnam and State of Florida, have invented new and useful Improvements in Handles, of which the following is a specification.

This invention relates to improvements in handles for cooking utensils, such as kettles or other receptacles adapted for containing heated water or other heated substances, and the object of the invention is to provide a utensil of this character with a suitable handle which may be positioned vertically upon the utensil or if desired may lie horizontally of the vessel without coming in contact with the same.

With the above, and other objects in view, which will appear as the description progresses, the invention resides in the novel construction and arrangement of parts, hereinafter fully described and claimed.

In the accompanying drawing there has been illustrated a simple and preferred embodiment of the improvement and in which:

Figure 1 illustrates a perspective view of the improvement in applied position upon an ordinary kettle. Fig. 2 is a fragmentary view illustrating in elevation the means for securing the handle in a vertical position. Fig. 3 is a similar view illustrating the handle in its horizontal position.

In the accompanying drawing the numeral 1 designates a suitable vessel adapted for containing heated water or other heated substances, and is provided with the ordinary removable top or closure 2.

Secured in diametrically opposite positions upon the receptacle 1 is a pair of upstanding members 3. These members 3 may be attached to the vessel 1 in any desired or preferred manner and each of the members are provided with an inwardly projecting lug or offset 4 while above the said offsets the members 3 are also provided with suitable perforations adapted for the reception of pivot members 5, by which the flattened portions 6 of the handle 7 are pivotally connected with the members 3. The handle 7 may be of any desired formation and the flattened portions 6 thereof are provided upon one of their edges with suitable recessed or cut away portions 8 and 9, arranged centrally of the pivot 5.

By the construction above described, it will be noted that when the handle is to be retained in a vertical position the lower cut away portion 9 engages the projecting portion 4 of the members 3 so as to effectively retain the handle in its upright position. When it is desired to remove the cover 2 from the receptacle 1, the handle 7 is swung upon its pivots 9 until the upper recess 8 engages the projection 4 of the members 3, thus effectively retaining the handle in an approximately horizontal position and out of contact with the vessel 1.

From the above description, taken in connection with the accompanying drawing, it will be noted that I have provided an extremely simple and inexpensive device for the purpose set forth, one in which the handle of a receptacle may be effectively retained in an approximately vertical position or, if desired may be swung from the vertical to a horizontal position without danger of the handle contacting the vessel.

Having thus fully described the invention what is claimed as new is:

The combination with a vessel, upstanding elements upon the vessel, projecting elements provided by the upstanding members, a handle having flattened portions pivotally connected with the upstanding members, each of said flattened portions having one of its edges provided with a pair of spaced recesses positioned centrally of its pivot, one of said recesses engaging the projecting element, thereby holding the handle in a vertical position, and the other recess engaging said element and holding the handle in a horizontal position.

In testimony whereof I affix my signature in presence of two witnesses.

ROLLIN R. BRAKEMAN.

Witnesses:
  E. H. MARSHALL,
  JOHN E. MARSHALL.